(12) United States Patent
Fan et al.

(10) Patent No.: US 11,756,094 B2
(45) Date of Patent: Sep. 12, 2023

(54) METHOD AND DEVICE FOR EVALUATING COMMENT QUALITY, AND COMPUTER READABLE STORAGE MEDIUM

(71) Applicant: BAIDU ONLINE NETWORK TECHNOLOGY (BEIJING) CO., LTD., Beijing (CN)

(72) Inventors: Miao Fan, Beijing (CN); Mingming Sun, Beijing (CN); Ping Li, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 242 days.

(21) Appl. No.: 16/803,943

(22) Filed: Feb. 27, 2020

(65) Prior Publication Data

US 2020/0278976 A1    Sep. 3, 2020

(30) Foreign Application Priority Data

Mar. 1, 2019  (CN) .......................... 201910157083.8

(51) Int. Cl.
    *G06Q 30/0601*   (2023.01)
    *G06F 16/2457*   (2019.01)
    *G06F 18/21*     (2023.01)

(52) U.S. Cl.
    CPC ... *G06Q 30/0625* (2013.01); *G06F 16/24573* (2019.01); *G06F 18/2178* (2023.01)

(58) Field of Classification Search
    CPC .. G06F 40/169; G06F 16/24573; G06F 40/30; G06N 3/0481; G06N 3/08;

(Continued)

(56) References Cited

U.S. PATENT DOCUMENTS

| 8,930,366 B2 * | 1/2015 | Rappoport | G06F 16/3347 707/E17.089 |
| 2005/0034071 A1 * | 2/2005 | Musgrove | G06F 40/30 715/256 |

(Continued)

FOREIGN PATENT DOCUMENTS

| CN | 105893350 A | 8/2016 |
| CN | 108153733 A | 6/2018 |

OTHER PUBLICATIONS

Vo, Chau, et al. "From helpfulness prediction to helpful review retrieval for online product reviews." Proceedings of the Ninth International Symposium on Information and Communication Technology. 2018. (Year: 2018).*

(Continued)

*Primary Examiner* — Sherief Badawi
*Assistant Examiner* — William P Bartlett
(74) *Attorney, Agent, or Firm* — COZEN O'CONNOR (57) ABSTRACT

Embodiments of the present disclosure provide a method and a device for evaluating a comment quality, an electronic device, and a computer readable storage medium. The method includes: selecting a metadata key associated with a comment of an object from metadata of the object, the metadata including a plurality of key-value pairs; determining a value corresponding to the metadata key based on the metadata; and evaluating the comment quality based on the comment and the value corresponding to the metadata key.

15 Claims, 6 Drawing Sheets

(58) Field of Classification Search
CPC .............. G06N 3/0445; G06K 9/6263; G06Q 30/0625; H04L 51/32
See application file for complete search history.

(56) References Cited

U.S. PATENT DOCUMENTS

| | | | | |
|---|---|---|---|---|
| 2007/0078845 | A1* | 4/2007 | Scott | G06Q 30/02 707/999.005 |
| 2009/0083096 | A1* | 3/2009 | Cao | G06Q 30/02 705/7.32 |
| 2011/0173191 | A1* | 7/2011 | Tsaparas | G06F 16/313 707/E17.084 |
| 2013/0268457 | A1* | 10/2013 | Wang | G06Q 30/0203 705/347 |
| 2015/0178279 | A1 | 6/2015 | Chen | |
| 2016/0164985 | A1* | 6/2016 | Song | H04L 51/52 709/206 |
| 2016/0342584 | A1* | 11/2016 | Han | G06Q 50/00 |
| 2018/0174203 | A1 | 6/2018 | L'Huillier et al. | |
| 2019/0050731 | A1* | 2/2019 | Lu | H04L 51/02 |

OTHER PUBLICATIONS

Liu, Yang, et al. "Modeling and predicting the helpfulness of online reviews." 2008 Eighth IEEE international conference on data mining. IEEE, 2008. (Year: 2008).*

Otterbacher, Jahna. "'Helpfulness' in online communities: a measure of message quality." Proceedings of the SIGCHI conference on human factors in computing systems. 2009. (Year: 2009).*

Chen, Chien Chin, and You-De Tseng. "Quality evaluation of product reviews using an information quality framework." Decision Support Systems 50.4 (2011): 755-768. (Year: 2011).*

Malik, M. S. I., and Ayyaz Hussain. "Helpfulness of product reviews as a function of discrete positive and negative emotions." Computers in Human Behavior 73 (2017): 290-302. (Year: 2017).*

Saumya, Sunil, et al. "Ranking online consumer reviews." Electronic commerce research and applications 29 (2018): 78-89. (Year: 2018).*

Soliman, Taysir Hassan A., et al. "Utilizing support vector machines in mining online customer reviews." 2012 22nd International Conference on Computer Theory and Applications (ICCTA). IEEE, 2012. (Year: 2012).*

Zhang, Rong, et al. "Online evaluation re-scoring based on review behavior analysis." 2014 IEEE/ACM International Conference on Advances in Social Networks Analysis and Mining (ASONAM 2014). IEEE, 2014. (Year: 2014).*

Chinese Patent Application No. 201910157083.8, Office Action dated Jan. 20, 2023, 8 pages.

Chinese Patent Application No. 201910157083.8, English translation of Office Action dated Jan. 20, 2023, 15 pages.

Wang, X. et al. "The effect of online customer reviews on product sales: Moderating effect of brand strength and category maturity" Journal of Industrial Engineering/Engineering Management, vol. 32, No. 3, 2018; pp. 9-18.

* cited by examiner

Hot user comment:

👤 user XYZ — 510

★★★★★ good photographing effect — 520

After more than a week of using the phone, the photographing effect are amazing, especially for the front camera, which is clear with automatic beautification, and the rear camera is real and soft in color. In short, a good phone, very recommended. — 530

Product information of Phone ABC
Space: 128G; Color: white
technical details — 610

| SCREEN SIZE | 5.8 inches |
|---|---|
| WEIGHT | 168 grams |
| COLOR | White |
| CAMERA PIXEL | 800/1200 |
| MEMORY | 8G |
| STORAGE SPACE | 128G |
| BATTERY | 4000 milliampere |
| ... | ... |

METHOD AND DEVICE FOR EVALUATING COMMENT QUALITY, AND COMPUTER READABLE STORAGE MEDIUM

CROSS-REFERENCE TO RELATED APPLICATIONS

This application claims priority to and benefits of Chinese Patent Application No. 201910157083.8, filed with the National Intellectual Property Administration of P. R. China on Mar. 1, 2019, the entire contents of which are incorporated herein by reference.

TECHNICAL FIELD

The present disclosure relates to the field of information technologies, and more particularly, to a method for evaluating a comment quality, a device for evaluating a comment quality, an electronic device, and a computer readable storage medium.

BACKGROUND

The development of network technology brings about growing number of network users, and the number of user-generated content on various network platforms is also increasing. Users can comment on various objects on different network platforms. For example, after browsing a web article or video, the user can comment on the article or video to express his/her opinion. For example, the user can comment on the product purchased on the e-commerce platform, to evaluate the usage experience of the product. These online comments can enrich relevant information of the object being commented, and also provide objective and true introduction of the object.

Due to the huge number of network users, there are large number of user comments on the network. The comments are generated by different users, some comments can help other users to know the product, and some comments provide limited information, or are even irrelevant to the object being commented.

SUMMARY

Embodiments of the present disclosure provide a method and a device for evaluating a comment quality, an electronic device, and a computer readable storage medium.

Embodiments of the present disclosure provide a method for evaluating a comment quality. The method includes: selecting a metadata key associated with a comment of an object from metadata of the object; determining a value corresponding to the metadata key based on the metadata; and evaluating the comment quality based on the comment and the value corresponding to the metadata key. The metadata includes a plurality of key-value pairs.

Embodiments of the present disclosure provide an electronic device, including one or more processors, and a storage device configured to store one or more programs. When the one or more programs are executed by the one or more processors, the method according to embodiments of the present disclosure is implemented.

Embodiments of the present disclosure provide a computer readable storage medium having a computer program stored thereon, when the program is executed by a processor, the method or solution according to the embodiments is implemented.

It is understood that the content of the present disclosure is not intended to limit the key characteristics or important characteristics of the embodiments of the present disclosure or the scope of the disclosure. Other characteristics of the present disclosure will be readily understood by the following description.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Embodiments of the present disclosure will be described in detail with reference to the drawings. Embodiments described herein with reference to drawings are explanatory, serve to explain the present disclosure, and are not construed to limit embodiments of the present disclosure. Instead, the embodiments of the present disclosure These embodiments are provided to provide a more complete and through understanding of the present disclosure. It should be understood that the embodiments described herein with reference to drawings are illustrative, and are not construed to limit the present disclosure.

In the description of the embodiments of the present disclosure, the term "include" and the like should be understood as open inclusion, that is, "including but not limited to". The term "based on" should be understood as "based at least in part". The term "one embodiment" or "an embodiment" should be taken as "at least one embodiment". The term "some embodiments" should be understood as "at least some embodiments". Other explicit and implicit meanings may also be included below.

In the related art, all comments for the same object are sorted according to the preset rule, for example, all comments can be sorted according to the publication time, or the number of likes of other users.

In the description of embodiments of the present disclosure, the term "comment" may also be referred to as a review, a message, or a reply, which refers to content (e.g., opinions, suggestion, evaluation, opinion) related to an object or a type of object. For example, the comment may include the user comment on the e-commerce platform, or the user comment in a feed application. The object may be a physical or virtual object, such as product, service, content of a certain form (e.g., news, video, short text). The comment may be written by relevant reviewers and submitted to a platform or website. In some embodiments, the comment may be in a text form. In some embodiments, comments may also include content in the form of audio, video, or picture. For these situations, content in the form of audio, video, or picture may be converted to the content in the text form, or the non-text form may be ignored.

In the description of the embodiments of the present disclosure, the "quality" of the comment may refer to the extent (or degree) to which the comment helps other users to evaluate the target object, may also referred to as the value, availability, utility, or usefulness of the comment. Generally, the user may desire to be able to evaluate, know, or learn one or more aspects (such as quality, characteristics, functions, advantages, disadvantages, details, etc.) of the object from the comments given by the reviewers. when a comment includes information about these aspects, the user tends to think that the comment is of high quality. Otherwise, the comment is considered to be of low quality. The quality of the comment may include a high quality, a low quality, or may be expressed by a score.

Using computing devices to perform quality (i.e., value) evaluation of massive user comments is a meaningful and challenging task. In the related art, in order to evaluate the quality of massive user comments on the network, other user's subjective evaluations for the value of the comment are obtained based on a crowdsourcing method. For example, a "vote" button (for example, a giving like button) may be provided for each comment, and the users can feedback the quality of the comment by voting or giving a like. However, this method can only collect evaluations of a small number of comments, and most of the online comments do not have voting data, or do not marked by other users.

In the related art, features, such as the structural features (e.g., the number of sentences, the sentence length), lexical features (e.g., the occurrence frequency of consecutive substrings having lengths of 1, 2 or 3), part of speech features (e.g., verb, noun in the comment), emotional features (e.g., emotional categories of the comment), semantic features (e.g., semantic categories), of the user comment text are analyzed manually, and machine learning classification is performed based on manually defined features, and the trained model is used for evaluating the comment quality. However, this method requires a large amount of manual work and expert knowledge for feature extraction, which increases the training cost, and the manually defined features cannot guarantee comprehensiveness and versatility, resulting in poor generalization ability. In addition, this method does not consider metadata information of the object being commented, the accuracy of is poor.

The quality of the comment is related to metadata (such as product name, brand, category, etc.) of the object being commented, and by considering the metadata of the object, more information can be provided, as features of the machine learning model.

Embodiments of the present disclosure provide a solution for evaluating a comment quality, which can accurately evaluate the quality of the user comment, and have low cost. With the solution, in evaluating the quality of the comment, both the content of the comment and metadata information related to the comment are considered, which can improve the accuracy of comment evaluation, some embodiments of the present disclosure will be described in detail below with reference to FIGS. 1-9.

Figure 1:
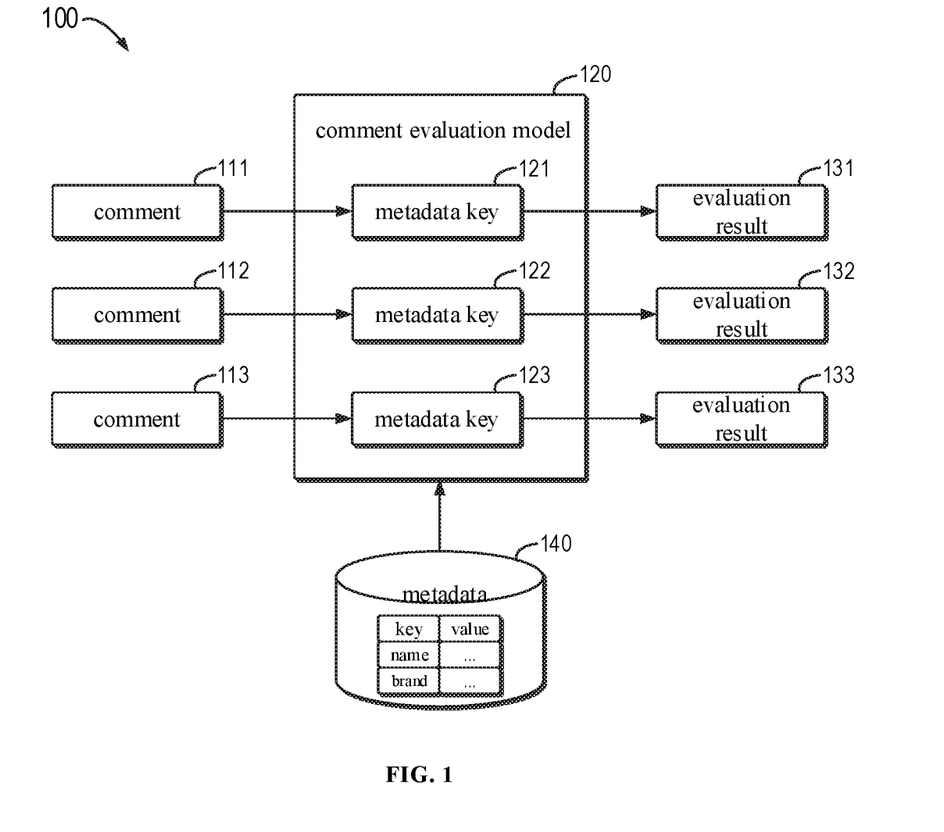
FIG. 1 is a schematic diagram of an environment for evaluating a comment quality according to some embodiments of the present disclosure.

FIG. 1 is a schematic diagram of an environment 100 for evaluating a comment quality according to some embodiments of the present disclosure. As illustrated in FIG. 1, in the environment 100, the comment evaluation model 120 can automatically evaluate input comments 111, 112 and 113, and generate the corresponding evaluation results 131, 132 and 133, respectively. In some embodiments, when evaluating the comment, the comment evaluation model 120 not only considers the content (such as content text) of the comment, but also considers the metadata information of the object being commented.

As illustrated in FIG. 1, for the input comment 111, the comment evaluation model 120 may determine a metadata key 121 (e.g., the brand of the object) corresponding to the comment 111 in metadata 140, the metadata 140 may include a plurality of key-value pairs, and then the comment evaluation model 120 may obtain a value corresponding to the metadata key 121 from the metadata 140, and obtain the evaluation result 131 (such as, an evaluation result indicating a high quality) based on the comment 111 and the value corresponding to the metadata key 121. Similarly, the comment evaluation model 120 may automatically select a metadata key 122 corresponding to the comment 112 and a metadata key 123 corresponding to the comment 113, and obtain the evaluation result 132 and the evaluation result 133 based on the comments 112 and 113 and the value corresponding to each of the metadata key 122 and 123, respectively. In some embodiments, the evaluation result may include a high quality, or a low quality. Alternatively, the evaluation result may be a score, when the score of a comment is greater than a threshold, it is determined that the comment has a high quality, and when the score of a comment is less than the threshold or another threshold, it is determined that the comment has a low quality.

In some embodiments, with the comment evaluation model 120, a high accuracy of evaluating comments can be achieved. The comments having high qualities may be displayed on top for other users' reference, or the comments may be ranked from high to low according to their scores, such that the users browsing the object can quickly know or learn the characteristics of the object being commented, thereby assisting the user in making decisions. and improving the user experience.

Figure 2:
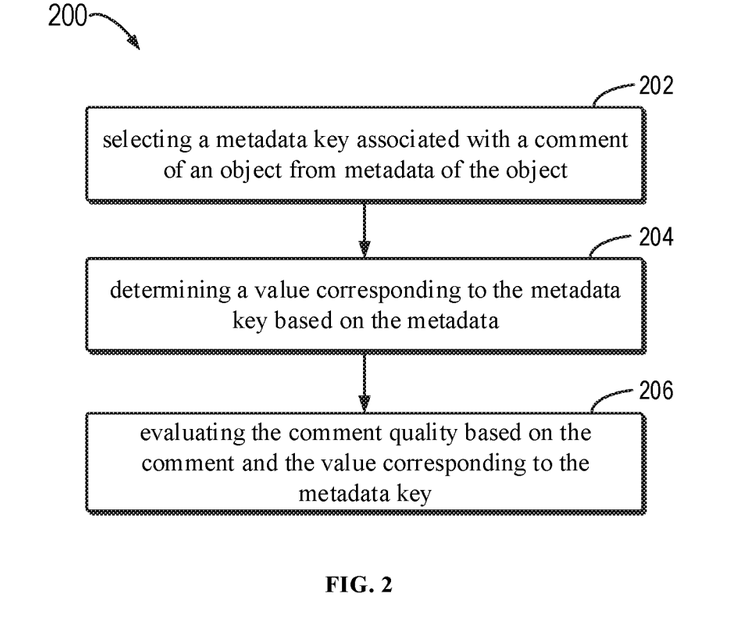
FIG. 2 is a flowchart of a method for evaluating a comment quality according to some embodiments of the present disclosure.

FIG. 2 is a flowchart of a method for evaluating a comment quality according to some embodiments of the present disclosure. It should be understood that, the method 200 illustrated in FIG. 2 may be implemented by the comment evaluation model 120 in FIG. 1.

At block 202, a metadata key associated with a comment of an object is selected from metadata of the object, the metadata includes a plurality of key-value pairs.

For example, the comment evaluation model 120 may select the metadata key 121 (such as the brand of the object being commented related to the comment 111) corresponding to the comment 111 from the metadata 140.

At block 204, a value corresponding to the metadata key selected is determined based on the metadata.

For example, the comment evaluation model 120 may obtain the brand name of the object being commented by querying the metadata 140.

At block 206, comment quality is evaluated based on the comment and the value corresponding to the metadata key.

For example, the comment evaluation model 120 may determine the quality of the comment by a constructed or trained comment evaluation model based on the value corresponding to the metadata key and the comment. An example implementation of training the comment evaluation model is described below with reference to FIGS. 3-4. Therefore, when evaluating the quality of the comment, the method 200 not only considers the content of the comment, but also introduces metadata information related to the comment, thus the accuracy of evaluating the comment can be improved.

Figure 3:
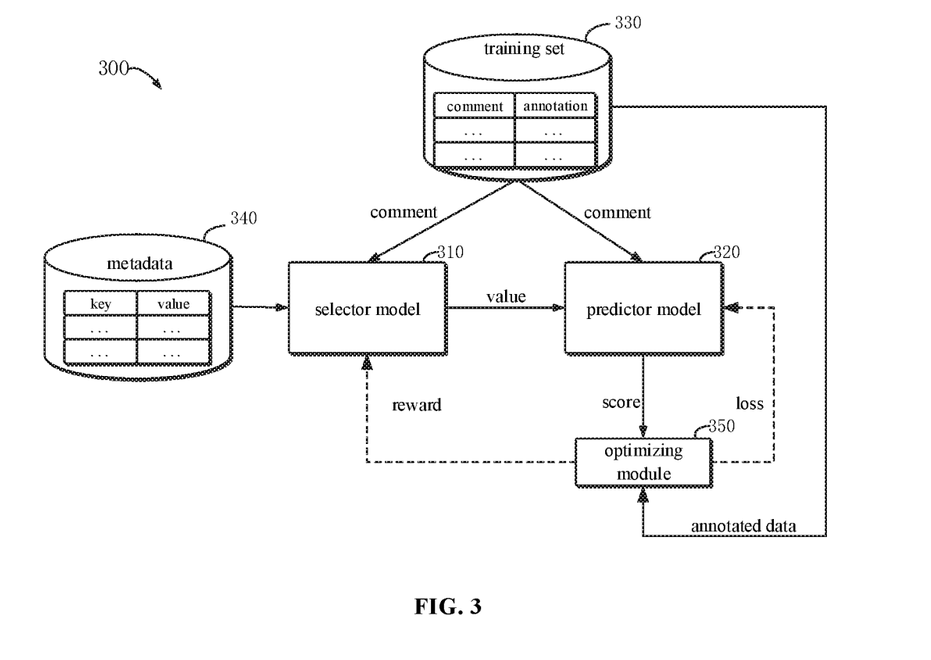
FIG. 3 is a schematic diagram of an architecture for evaluating a comment quality according to some embodiments of the present disclosure.

FIG. 3 is a schematic diagram of an exemplary architecture 300 for evaluating a comment quality according to some embodiments of the present disclosure, which may be a reinforcement learning framework based on deep neural network for evaluating the value of the user comment. As illustrated in FIG. 3, the comment evaluation model 120 illustrated in FIG. 1 may include a selector model 310, a predictor model 320, and an optimizing module 350. The selector model 310 may be configured to perform acts of selecting the metadata key and determining the corresponding value. The predictor model 320 may be configured to evaluate or predict the quality of the comment based on the determined corresponding value and the comment content. The selector model 310 may be set as an agent for reinforcement learning.

In some embodiments, a training set 330 may be used to train the selector model and the predictor model, and the training set 330 may include a plurality of comments and annotated data indicating the quality of each comment. The annotated data may be manually annotated conclusions for each comment, for example, a comment may be manually annotated as a high quality or low quality. In some embodiments, the annotated data may also be voting data for comments fetched from network, and the voting data may be provided by a plurality of network users. For example, when a comment is liked by many people, the quality of the comment may be high, in this way, the annotated data in the training set can be automatically obtained, such that the labor cost for model training can be reduced.

Figure 5:
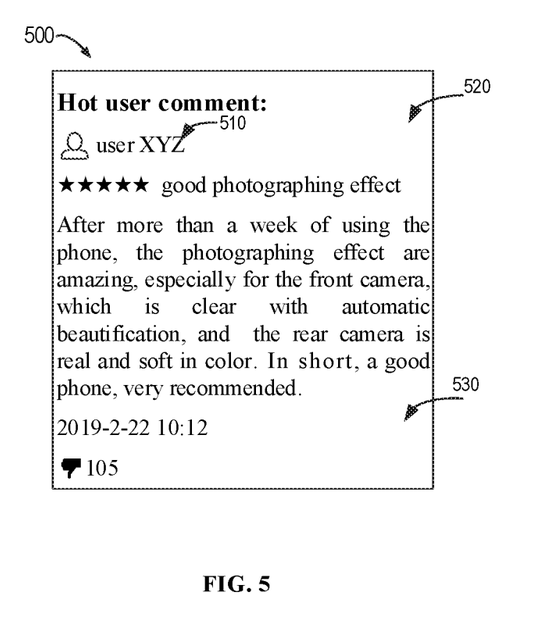
FIG. 5 is a diagram of an exemplary user comment on a network platform according to some embodiments of the present disclosure.

FIG. 5 is a schematic diagram 500 of an exemplary user comment on an e-commerce platform according to some embodiments of the present disclosure. As shown in FIG. 5, the information associated with the comment may include the name 510 of the reviewer, the comment content 520, and the publication time of the comment. In addition, the information may also include the reviewer's subjective evaluation on the object (e.g. five-star high praise in FIG. 5). FIG. 5 also includes voting data 530 of the comment 520, indicating that 105 persons give their like to comment 520. Therefore, the voting data 530 can be taken as annotated data, and stored in the training set 330 with the comment 520.

Figure 6:
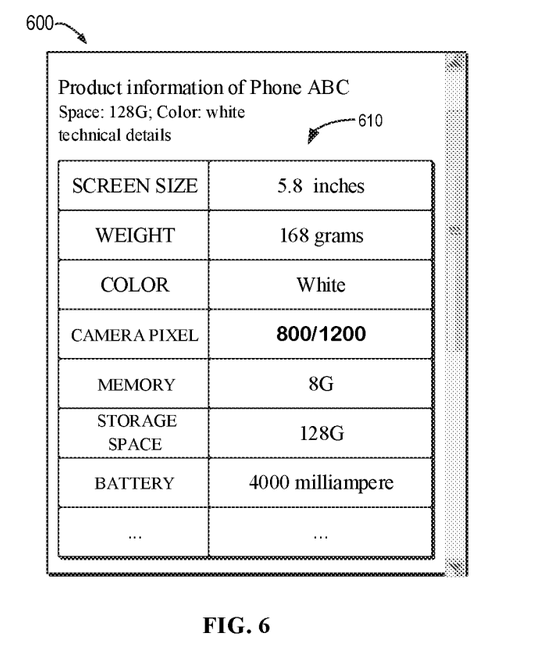
FIG. 6 is a diagram of an exemplary metadata on a network platform according to some embodiments of the present disclosure.

As illustrated in FIG. 3, the metadata 340 may include metadata information of each of the plurality of objects, and the information may be expressed in the form of key-value pair. FIG. 6 is a schematic diagram 600 of metadata on an e-commerce platform according to some embodiments of the present disclosure. FIG. 6 illustrates a product introduction page of a phone ABC, which includes some technical details 610 of the phone, and some or all of the technical details 610 may be extracted and processed as metadata 340 of the phone ABC. In some embodiments, some generic metadata keys may be set, such as object name, brand, category, etc. Alternatively, specific metadata keys may be set for a class of objects. For example, as shown in FIG. 6, for the phone product, its metadata keys may include screen size, weight, color, camera pixel, memory, storage space, battery, etc.

As illustrated in FIG. 3, for a comment obtained from the training set 330, the selector model 310 may selects a metadata key from the metadata 340 of the object corresponding to the comment. In some embodiments, a probability distribution for each metadata key may be obtained, and the metadata key having the highest probability may be selected. Then, the selector model 310 may determine the value corresponding to the selected metadata key based on the metadata 340, and transmit the value to the predictor model 320.

The predictor model 320 may determine the quality of the comment based on the comment received from the training set 330 and the value received from the selector model 310. In an example, the score of the comment predicted by the predictor model 320. In addition to considering the comment, the predictor model 320 also considers the metadata information of the object being commented, such that the score of the comment can be accurately predicted. In some embodiments, the predictor model 320 may transmit the predicted score to the optimizing module 350 for training optimization.

The optimizing module 350 may calculate the predicted loss based on the score obtained from the predictor model 320 and the corresponding annotated data obtained from the training set 330, and optimize the predictor model 320 by the stochastic gradient descent method. In addition, the optimizing module 350 can also give the selector model 310 a reward based on the performance of the predictor model 320, and optimize the selector model 310 by the policy gradient method. For example, when the predicted score is close to the annotated data, it indicates that the key selected by the selector model 310 is accurate, and the selector model 310 can be given a reward. Conversely, when the predicted score differs greatly from the annotated data, the selector model 310 will not be rewarded.

Figure 4:
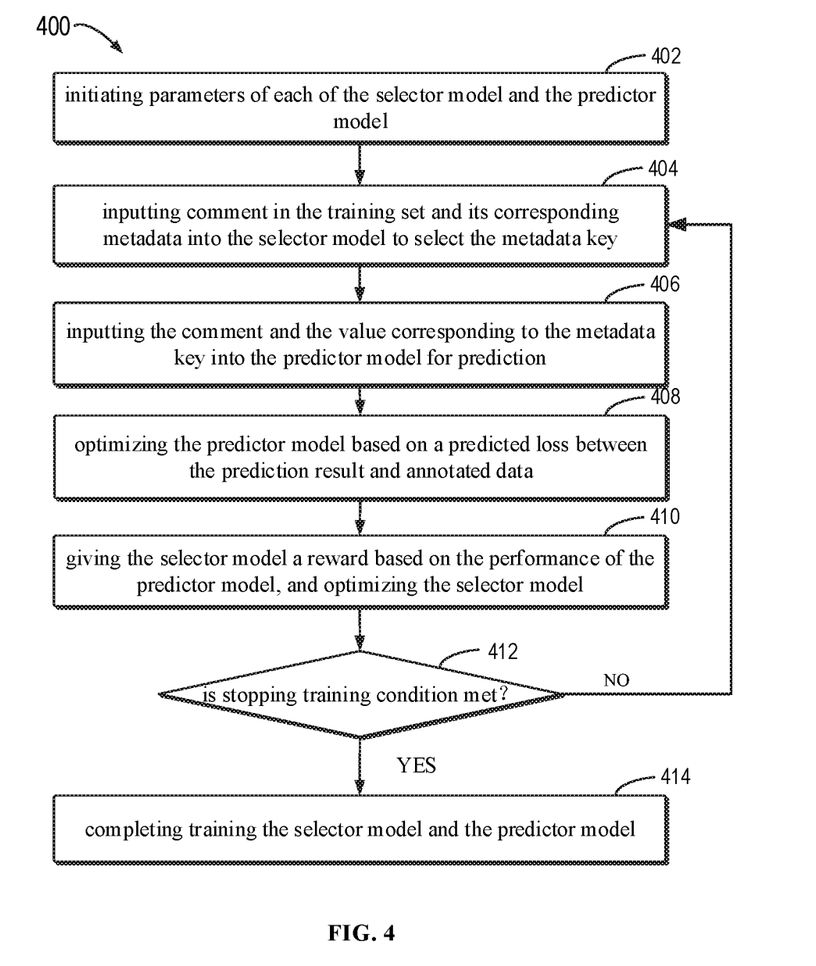
FIG. 4 is a flowchart of a method for training a selector model and a predictor model according to some embodiments of the present disclosure.

FIG. 4 is a flowchart of a method 400 for training a selector model and a predictor model according to some embodiments of the present disclosure. For example, the method 400 may be performed before the method 200 described above in FIG. 2.

At block 402, parameters in the selector model and the predictor model are initialized.

In some embodiments, before training, all parameters to be learned in the selector model 310 and the predictor model 320 may be initialized.

At block 404, the comment in the training set and the corresponding metadata are input into the selector model, to select the metadata key.

In some embodiments, the comment in the training set 330 and the corresponding metadata 340 may be input into the selector model 310 for selecting the metadata key.

At block 406, the comment and the value corresponding to the metadata key are input into the predictor model for prediction.

In some embodiments, the comment and the value corresponding to the metadata key selected by the selector model 310 may be input into the predictor model 320 for prediction.

At block 408, the predictor model is optimized based on the predicted loss between the prediction result and the annotated data of the comment.

In some embodiments, the predictor model 320 may be optimized based on the predicted loss between the prediction result and the annotated data of the comment. In an example, the predictor model may be optimized by a stochastic gradient descent method. The stochastic gradient descent method is updated iteratively for each sample, which minimizes the loss function of each sample, although the loss function obtained by each iteration is not in the direction of global optimization, the overall direction is toward the global optimal solution, and the final result is near the global optimal solution.

At block 410, it is determined whether to give the selector model a reward based on the performance of the predictor model, and when it is determined to give the selector model the reward, the selector model is optimized by the reward.

In some embodiments, it may be determined whether to give the selector model 310 a reward based on the performance of the predictor model 320, and when it is determined to give the selector model 310 a reward, the selector model may be optimized by the reward.

In an example, the selector model may be optimized by a reinforcement learning method such as the policy gradient method. The policy gradient method is a policy optimization method, which updates the policy parameters by continuously calculating the gradient of the expected total reward regarding the policy parameters, and finally converges to the optimal strategy. In the embodiment of the present disclosure, the selector model and the predictor model may be trained and optimized simultaneously in the training process, thereby improving the training efficiency. In some embodiments, the star rating of the user comment may be used as a reward for the selector model.

At block 412, it is determined whether a stopping training condition is met.

In some embodiments, the stopping training condition may include convergence of the error loss, or the number of iterations is greater than a predetermined threshold. When the stopping training condition is not met, the training continues using the comments in the training set, and blocks 404-410 are iteratively or repeatedly performed. When the stopping training condition is met, the training of the selector model 310 and the predictor model 320 is completed (block 414).

After completing the training of the selector model 310 and the predictor model 320, the selector model 310 and the predictor model 320 may be initialized by using the trained parameters, so as to automatically evaluate the quality of new user comments. For example, for a new comment, when its predicted score is greater than 0.5, it may be determined that the comment is valuable, and when the predicted score is less than 0.5, it may be determined that the comment is invaluable. Thus, in the embodiment, the selector model and the predictor model can be simultaneously trained, thereby saving training costs, and due to the use of the metadata key corresponding to the comment, the accuracy of the model can be improved.

In some embodiments, the reinforcement learning framework based on deep neural network can eliminate manually set features, and automatically learn feature representations of the comment content, such that high quality comments can be mined. The comment text can be used as input without preprocessing, and the evaluation result of the quality of the comment can be output. Due to automatic learning, the accuracy of the model can be improved. In addition, by using metadata information of the object to assist in evaluation of the comment, the accuracy of the model can be improved, and generalization ability of the model can also be improved.

Figure 7:
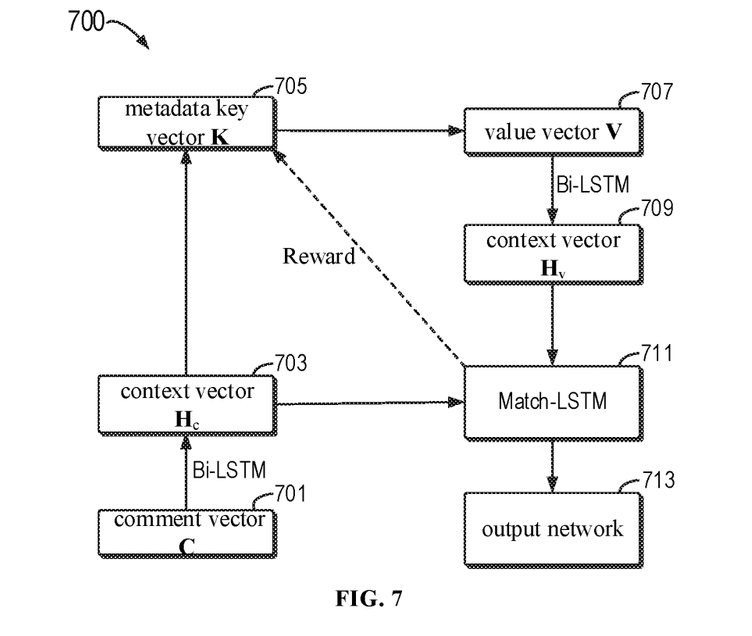
FIG. 7 is a schematic diagram of a process for comment value evaluation by using a comment evaluation model according to some embodiments of the present disclosure.

FIG. 7 is a schematic diagram of a process 700 for comment value evaluation by using a comment evaluation model according to some embodiments of the present disclosure. As illustrated in FIG. 7, the user comment c includes n words or characters, each of the n words or characters may be converted into a word vector (e.g., a 1-dimensional vector) by querying a preset or trained vector table, and a comment vector $C \in R^{l \times n}$ can be obtained (block 701). In order to implement local context embedding of the user comment c, the comment vector C may be encoded by bidirectional long-term and short-term memory (Bi-LSTM for short) to obtain the context vector Hc (block 703), which may be expressed by:

$$H_c = Bi\text{-}LSTM(C) \quad (1)$$

where $H_c \in R^{2l \times n}$ denotes the context embedding, each word or phrase can obtain two hidden units having a length of 2l, which encodes the forward and backward context information of the user comment.

Similarly, the metadata of the object being commented includes k keys, and a metadata key vector $K \in R^{l \times k}$ may be generated by converting each metadata key in the metadata into a vector with a predetermined dimension, such as a l-dimensional vector (block 705). By multiplying the context vector and the metadata key vector K, the user comment representation, such as an attention matrix, perceived by the metadata key may be obtained, each row of the attention matrix may be added, and the probability distribution of the metadata keys can be obtained by a softmax function, and the metadata key with the highest probability may be selected. For example, the bi-linear relationship between the metadata key vector K and the context vector $H_c$ of the user comment C may be obtained using $B \in R^{k \times n}$, which may be expressed by:

$$B = ReLU(K^T W H_c) \quad (2)$$

where $W \in R^{l \times 2l}$ is a weight matrix of rectified linear units (ReLU).

The i-th row of B includes aspect/topic features of the context vector alignment of the user comment, the Reduce_max policy may be applied to each row of B to retain the most efficient feature for each metadata key, and the policy p may be obtained by using the softmax function, which may be expressed by:

$$p = Softmax(Reduce\_max(B, axis=1)) \quad (3)$$

The selector model π may select the value $\upsilon \sim \pi(\upsilon | K, C)$ corresponding to the metadata key according to the policy p. Then, assuming that the value has m words or characters, and each word or phrase may be converted to a word vector by querying a vector table to obtain a value vector $V \in R^{l \times m}$ (block 707).

At block 709, the value vector V may be encoded by Bi-LSTM to obtain a context vector $H_v \in R^{2l \times m}$ which may be expressed by:

$$H_v = Bi\text{-}LSTM(V) \quad (4)$$

At block 711, the context vector $H_c$ of the user comment and the context vector $H_v$ of the value may be combined for encoding, to improve the prediction accuracy.

For example, a matching representation matrix may be obtained by Match-LSTM, and the matching result may be taken as a reward, to feed back to the selector model.

At block 713, the matching representation matrix is predicted through the output network.

In an example, referring to the predictor model in FIG. 3, which uses deep neural network for training and prediction, and any neural network known or to be developed may be applied, which is not limited in the present disclosure. For example, word-level matching is shown in the following equation (5):

$$Q = \text{ReLU}(W'H_v + b' \otimes e)^T H_c \tag{5}$$

where $W' \in R^{2l \times 2l}$ is a weight matrix, and $b' \in R^{2l}$ is a base vector. The output vector product $\otimes$ copies the basis vector b' m times to generate a 2l×m matrix, $e \in R^m$, $Q \in R^{m \times n}$ is a sparse matrix that retains word-level matching information between the value v and the user comment c.

The softmax function may be applied to each row of Q to obtain the attention matrix $G \in R^{m \times n}$, whose i-th row represents the normalized attention weight of all words in the value v for the i-th word in the user comment c, G may be expressed:

$$G = \text{softmax}(Q) \tag{6}$$

Then, based on the attention matrix $G \in R^{m \times n}$ and $Hv \in R^{2l \times m}$, the comment representation $\overline{H}_c \in R^{2l \times n}$ with a known object may be reformulated, which may be expressed by:

$$\overline{H}_c = H_v G \tag{7}$$

By combining the context vector $H_c$ and the comment representation $\overline{H}_c$, the value/quality of the user comment may be predicted by using a feature matrix $H \in R^{2l \times n}$, which may be expressed by:

$$H = H_c + \overline{H}_c \tag{8}$$

A loss function $L(s_g | H_c)$ may be defined, which predicts the true score $s_g$ by taking $H_c$ as features. Given a value v selected by the selector model, the objective is to minimize the expectation, which is expressed by:

$$J(\Theta) = \mathbb{E}_{v \sim \pi(v|K,C)}[L(s^g|v, H^c)] \tag{9}$$

The above formula (9) denotes that, v is randomly sampled according to the probability distribution of $\pi(v|K,C)$, the expectation $\mathbb{E}$ is calculated for $L(s^g|vH^c)$ obtained from all samples, i.e., the expectation is calculated by weighting and summing $L(s^g|vH^c)$ according to the probability of sampling, $\Theta$ is a parameter to be learned, the gradient of $J(\Theta)$ regarding $\Theta$ may be expressed by:

$$\nabla_\Theta J(\Theta) = \nabla_\Theta \sum_v \pi(v|K, C)[L(s^g | v, H^c)] = \tag{10}$$

$$\sum_v (L(s^g | v, H^c) \nabla_\Theta \pi(v|K, C) + \pi(v|K, C) \nabla_\Theta L(s^g | v, H^c)) =$$

$$\mathbb{E}_{v \sim \pi(v|K,C)}[L(s^g | v, H^c) \nabla_\Theta \log \pi(v | K, C) + \nabla_\Theta L(s^g | v, H^c)]$$

where $\nabla_\Theta L(s^g|vH^c)$ denotes training the predictor model by the stochastic gradient descent, and updating the selector model based on gradient of log $\pi(v|H^c)$ (the loglikelihood of $\pi(v|H^c)$) and the reward $L(s_g|v, E (0.0, 1.0]$ by reinforcement learning algorithm.

In this way, the selector model and the predictor model may be trained. It should be understood that, FIG. 7 illustrates an exemplary implementation for implementing training and prediction of the comment evaluation model, the present disclosure is not limited thereto.

Figure 8:
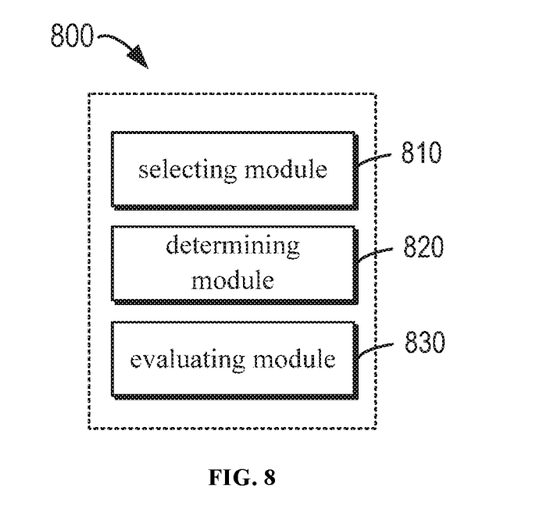
FIG. 8 is a block diagram of a device for evaluating a comment quality according to some embodiments of the present disclosure.

FIG. 8 is a block diagram of a device 800 for evaluating a comment quality according to some embodiments of the present disclosure. As illustrated in FIG. 8, the device 800 includes a selecting module 810, a determining module 820, and an evaluating module 830. The selecting module 810 is configured to select a metadata key associated with a comment of an object from metadata of the object, and the metadata includes a plurality of key-value pairs. The determining module 820 is configured to determine a value corresponding to the metadata key based on the metadata. The evaluating module 830 is configured to evaluate the comment quality based on the comment and the value corresponding to the metadata key.

In some embodiments, the selecting module 810 includes: a first vector generating module, a second vector generating module, a correlation determining module, and a metadata key selecting module. The first vector generating module is configured to generate a first vector of the comment by converting each word or phrase in the comment into a word vector. The second vector generating module is configured to generate a second vector of the metadata by converting each metadata key in the metadata to a predetermined dimension vector. The correlation determining module is configured to determine a relevance of each metadata key in the metadata to the comment based on the first vector and the second vector. The metadata key selecting module is configured to select a metadata key having a maximum relevance to the comment from the metadata.

In some embodiments, the evaluating module 830 includes: a third vector generating module, and a quality determining module. The third vector generating module is configured to generate a third vector of the value corresponding to the metadata key. The quality determining module is configured to determine the comment quality based on the third vector and the first vector.

In some embodiments, the quality determining module includes: a score determining module, a high-quality determining module, and a low-quality determining module. The score determining module is configured to determine a score of the comment based on the third vector and the first vector. The high-quality determining module is configured to determine that the comment has a high quality in response to determining that the score is greater than a first threshold. The low-quality determining module is configured to determine that the comment has a low quality in response to determining that the score is less than a second threshold. The first threshold is greater than or equal to the second threshold.

In some embodiments, the selecting module 810 and the determining module 820 are included in a selector model, the evaluating module 830 is included in a predictor model, and the device further includes a training module. The training module is configured to simultaneously train the selector model and the predictor model by using a training set. The training set includes a plurality of comments and annotated data indicating a quality of each comment.

In some embodiments, the training module includes: an initiating module, a first metadata key selecting module, a predicting module, a first optimizing module, a third determining module, and a second optimizing module. The initiating module is configured to initiate parameters of each of the selector model and the predictor model. The first metadata key selecting module is configured to input a first comment in the training set and first metadata corresponding to the first comment into the selector model to select a first metadata key. The predicting module is configured to input the first comment and a first value corresponding to the first metadata key into the predictor model to generate a first prediction result. The first optimizing module is configured to optimize the predictor model based on a predicted loss between the first prediction result and first annotated data of the first comment. The third determining module is config-ured to determine whether to give the selector model a reward based on a performance of the predictor model. The second optimizing module is configured to optimize the selector model by using the reward in response to determining to give the selector model the reward.

In some embodiments, the first optimizing module includes a third optimizing module.

The third optimizing module is configured to optimize the predictor model by a stochastic gradient descent method. The second optimizing module includes a fourth optimizing module. The fourth optimizing module is configured to optimize the selector model, includes: optimizing the selector model by a policy-gradient method.

In some embodiments, the annotated data includes voting data of the comment fetched from network, and the voting data is provided by a plurality of network users.

The selecting module 810, the determining module 820, and the evaluating module 830 shown in FIG. 8 may be included in one or more electronic devices. Moreover, the modules illustrated in FIG. 8 may perform steps or acts in the methods or processes of some embodiments of the present disclosure.

Figure 9:
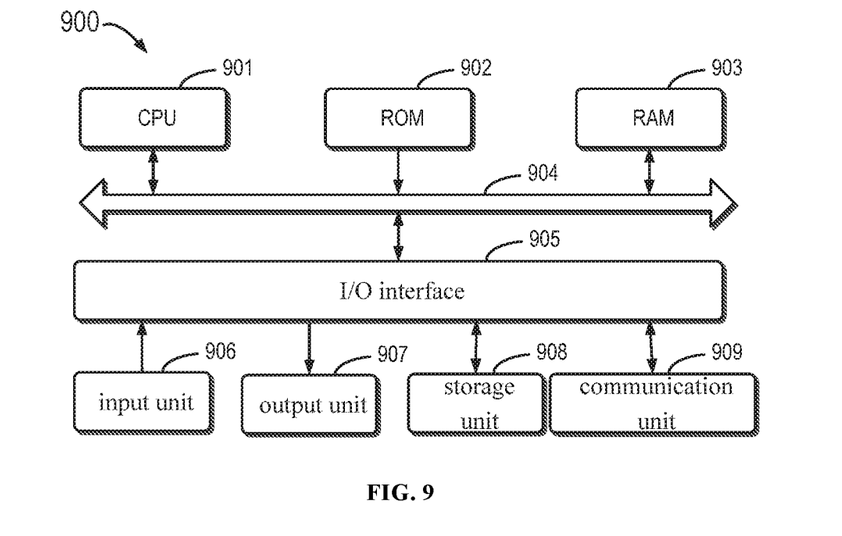
FIG. 9 is a block diagram of an electronic device for implementing some embodiments of the present disclosure.

FIG. 9 is a block diagram of an exemplary device 900 for implementing some embodiments of the present disclosure. It should be understood that the device 900 can be used to implement the device 900 for evaluating the comment quality described in the present disclosure. As shown in FIG. 9, the device 900 includes a central processing unit (CPU) 901 that perform various appropriate acts and processes according to computer program instructions stored in a read only memory (ROM) 902 or the computer program instructions loaded into a random-access memory (RAM) 903 from a storage unit 908. Various programs and data required for the operation of the device 900 can also be stored in the RAM 903. The CPU 901, the ROM 902, and the RAM 903 are connected to each other through a bus 904. An input/output (I/O) interface 905 is also coupled to the bus 904.

A plurality of components in the device 900 are coupled to the I/O interface 905, including: an input unit 906, such as a keyboard, a mouse; an output unit 907, such as various types of displays, and speakers; a storage unit 908, such as a disk and an optical disk; and a communication unit 909 such as a network card, a modem, and a wireless communication transceiver. The communication unit 909 allows the device 900 to exchange information/data with other devices over a computer network such as the Internet and/or various telecommunication networks.

A processing unit performs the various methods and processes described above, such as the methods 200 and 400. For example, in some embodiments, a method can be implemented as a computer software program that is tangibly embodied in a machine readable medium, such as the storage unit 908. In some embodiments, some or all of the computer program may be loaded and/or installed onto the device 900 via the ROM 902 and/or the communication unit 909. When a computer program is loaded into the RAM 903 and executed by the CPU 901, one or more acts or steps of the methods described above may be performed. Alternatively, in other embodiments, the CPU 901 can be configured to perform the method by any other suitable means (e.g., by means of firmware).

The functions described above herein may be performed, at least in part, by one or more hardware logic components. For example, without limitation, exemplary types of hardware logic components that may be used include: Field Programmable Gate Array (FPGA), Application Specific Integrated Circuit (ASIC), Application Specific Standard Product (ASSP), System on a Chip (SOC), Complex Programmable Logic Device (CPLD).

Program code for implementing the methods of the present disclosure can be written in any combination of one or more programming languages. The program code may be provided to a general purpose computer, a special purpose computer or a processor or controller of other programmable data processing device, such that the program code, when executed by the processor or the controller, causes the functions/operations specified in the flowcharts and/or block diagrams is implemented. The program code may be executed entirely on the machine, partly on the machine, as part of the stand-alone software package, and partly on the remote machine or entirely on the remote machine or server.

In the context of the present disclosure, a machine-readable medium can be a tangible medium that contain or store a program for use by or in combination with an instruction execution system, an apparatus, or a device. The machine readable medium can be a machine readable signal medium or a machine readable storage medium. The machine-readable medium can include, but is not limited to, an electronic, magnetic, optical, electromagnetic, infrared, or semiconductor system, apparatus, or device, or any suitable combination of the foregoing. More specific examples of the machine readable storage medium may include electrical connections based on one or more wires, a portable computer disk, a hard disk, a random access memory (RAM), a read only memory (ROM), an erasable programmable read only memory (EPROM or flash memory), optical fiber, compact disk read only memory (CD-ROM), optical storage device, magnetic storage device, or any suitable combination of the foregoing.

In addition, although the operations are depicted in a particular order, this should be understood to require that such operations be performed in the particular order shown or in sequential order, or that all illustrated operations should be performed to achieve the desired results. Multitasking and parallel processing may be advantageous in certain circumstances. Likewise, although several specific implementation details are included in the above discussion, these should not be construed as limiting the scope of the disclosure. Certain characters that are described in the context of separate embodiments can also be implemented in combination in a single implementation. Conversely, various characters that are described in the context of a single implementation can be implemented in a plurality of implementations, either individually or in any suitable sub-combination.

Although the subject matter has been described in language specific to structural characters and/or methodological acts, it is understood that the subject matter defined in the appended claims is not limited to the specific features or acts described above. Instead, the specific characters and acts described above are merely exemplary forms of implementing the claims.

What is claimed is:

1. A method for evaluating an object comment, performed by an electronic device, comprising:
    receiving an object comment in the form of audio, video, or picture, and converting the object comment into a text;
    selecting by a selector model, a target metadata key associated with the text from metadata of the object, wherein the metadata of the object includes a plurality of key-value pairs and metadata keys in the plurality of key-value pairs are hardware parameters of the object;

determining by the selector model, a target value corresponding to the target metadata key by querying the metadata;

determining by a predictor model, a score of the text based on the text and the target value corresponding to the target metadata key; and displaying on top an object comment corresponding to a text with the maximum score in a comment display interface of an e-commerce platform;

wherein the selector model and the predictor model are simultaneously trained with a training set that comprises a plurality of texts and annotated data indicating a score of each text, by acts of:

initializing parameters of each of the selector model and the predictor model;

inputting a first text in the training set and first metadata corresponding to the first text into the selector model to select a first metadata key;

obtaining a bi-linear relationship between the first metadata key and a context of the first text, and selecting a first value corresponding to the first metadata key based on a policy of p=Softmax(Reduce_max(B,axis=1), where B indicates the bi-linear relationship;

inputting the first text and the first value corresponding to the first metadata key into the predictor model to generate a first prediction result;

optimizing the predictor model by a stochastic gradient descent method based on a predicted loss between the first prediction result and first annotated data of the first text;

determining whether to give the selector model a reward based on a performance of the predictor model, wherein the reward is within a range of (0.0, 1.0] based on a loss function that predicts a true score by taking the context as features; and optimizing the selector model by a policy gradient method using the reward in response to determining to give the selector model the reward, wherein the policy gradient method is configured to update policy parameters by continuously calculating a gradient of the expected total reward regarding the policy parameters and converge to an optimal policy.

2. The method according to claim 1, wherein said selecting the metadata key comprises:

generating a first vector of the text by converting each word or phrase in the text into a word vector;

generating a second vector of the metadata by converting each metadata key in the metadata to a predetermined dimension vector;

determining a relevance of each metadata key in the metadata to the text based on the first vector and the second vector; and selecting a metadata key having a maximum relevance to the text from the metadata.

3. The method according to claim 2, wherein said determining the score of the text comprises:

generating a third vector of the value corresponding to the metadata key; and determining the score of the text based on the third vector and the first vector.

4. The method according to claim 3, wherein said determining the score of the text comprises:

determining that the text of the object comment has a high score in response to determining that the score is greater than a first threshold; and determining that the text of the object comment has a low score in response to determining that the score is less than a second threshold, wherein the first threshold is greater than or equal to the second threshold.

5. The method according to claim 1, wherein the annotated data comprises voting data of the object comment fetched from network, and the voting data is provided by a plurality of network users.

6. A device for evaluating an object comment, comprising:

one or more processors; and a storage device, configured to store one or more programs, wherein when the one or more programs are executed by the one or more processors, the one or more processors are configured to:

receive an object comment in the form of audio, video, or picture, and converting the object comment into a text;

select a target metadata key associated with the text from metadata of the object, wherein the metadata of the object includes a plurality of key-value pairs and metadata keys in the plurality of key-value pairs are hardware parameters of the object;

determine a target value corresponding to the target metadata key by querying the metadata; and determine a score of the text based on the text and the target value corresponding to the target metadata key; and display on top an object comment corresponding to a text with the maximum score in a comment display interface of an e-commerce platform;

wherein the selector model and the predictor model are simultaneously trained with a training set that comprises a plurality of texts and annotated data indicating a quality of each text, by acts of:

initializing parameters of each of the selector model and the predictor model;

inputting a first text in the training set and first metadata corresponding to the first text into the selector model to select a first metadata key;

obtaining a bi-linear relationship between the first metadata key and a context of the first text, and selecting a first value corresponding to the first metadata key based on a policy of p=Softmax(Reduce_max(B,axis=1), where B indicates the bi-linear relationship;

inputting the first text and the first value corresponding to the first metadata key into the predictor model to generate a first prediction result;

optimizing the predictor model by a stochastic gradient descent method based on a predicted loss between the first prediction result and first annotated data of the first text;

determining whether to give the selector model a reward based on a performance of the predictor model, wherein the reward is within a range of (0.0, 1.0] based on a loss function that predicts a true score by taking the context as features; and optimizing the selector model by a policy gradient method using the reward in response to determining to give the selector model the reward, wherein the policy gradient method is configured to update policy parameters by continuously calculating a gradient of the expected total reward regarding the policy parameters and converge to an optimal policy.

7. The device according to claim 6, wherein the one or more processors are further configured to:

generate a first vector of the text by converting each word or phrase in the text into a word vector;

generate a second vector of the metadata by converting each metadata key in the metadata to a predetermined dimension vector;

determine a relevance of each metadata key in the metadata to the text based on the first vector and the second vector; and select a metadata key having a maximum relevance to the text from the metadata.

8. The device according to claim 7, wherein the one or more processors are further configured to:

generate a third vector of the value corresponding to the metadata key; and determine the score of the text based on the third vector and the first vector.

9. The device according to claim 8, wherein the one or more processors are further configured to:

determine that the text of the object comment has a high score in response to determining that the score is greater than a first threshold; and determine that the text of the object comment has a low score in response to determining that the score is less than a second threshold, wherein the first threshold is greater than or equal to the second threshold.

10. The device according to claim 6, wherein the annotated data comprises voting data of the object comment fetched from network, and the voting data is provided by a plurality of network users.

11. A non-transitory computer readable storage medium having stored thereon a computer program that, when executed by a processor, cause a method for evaluating an object comment to be implemented, the method comprising:

receiving an object comment in the form of audio, video, or picture, and converting the object comment into a text;

selecting by a selector model, a target metadata key associated with the text from metadata of the object, wherein the metadata of the object includes a plurality of key-value pairs and metadata keys in the plurality of key-value pairs are hardware parameters of the object;

determining by the selector model, a target value corresponding to the target metadata key by querying the metadata;

determining by a predictor model, a score of the text based on the text and the target value corresponding to the target metadata key; and displaying on top an object comment corresponding to a text with the maximum score in a comment display interface of an e-commerce platform;

wherein the selector model and the predictor model are simultaneously trained with a training set that comprises a plurality of texts and annotated data indicating a score of each text, by acts of:

initializing parameters of each of the selector model and the predictor model;

inputting a first text in the training set and first metadata corresponding to the first text into the selector model to select a first metadata key;

obtaining a bi-linear relationship between the first metadata key and a context of the first text, and selecting a first value corresponding to the first metadata key based on a policy of p=Softmax(Reduce_max(B,axis=1), where B indicates the bi-linear relationship;

inputting the first text and the first value corresponding to the first metadata key into the predictor model to generate a first prediction result;

optimizing the predictor model by a stochastic gradient descent method based on a predicted loss between the first prediction result and first annotated data of the first text;

determining whether to give the selector model a reward based on a performance of the predictor model, wherein the reward is within a range of (0.0, 1.0] based on a loss function that predicts a true score by taking the context as features; and optimizing the selector model by a policy gradient method using the reward in response to determining to give the selector model the reward, wherein the policy gradient method is configured to update policy parameters by continuously calculating a gradient of the expected total reward regarding the policy parameters and converge to an optimal policy.

12. The non-transitory computer readable storage medium according to claim 11, wherein said selecting the metadata key comprises:

generating a first vector of the text by converting each word or phrase in the text into a word vector;

generating a second vector of the metadata by converting each metadata key in the metadata to a predetermined dimension vector;

determining a relevance of each metadata key in the metadata to the text based on the first vector and the second vector; and selecting a metadata key having a maximum relevance to the text from the metadata.

13. The non-transitory computer readable storage medium according to claim 12, wherein said determining the score of the text comprises:

generating a third vector of the value corresponding to the metadata key; and determining the score of the text based on the third vector and the first vector.

14. The non-transitory computer readable storage medium according to claim 13, wherein said determining the score of the text comprises:

determining that the text of the object comment has a high score in response to determining that the score is greater than a first threshold; and determining that the text of the object comment has a low score in response to determining that the score is less than a second threshold, wherein the first threshold is greater than or equal to the second threshold.

15. The method according to claim 1, wherein the annotated data comprises voting data of the object comment fetched from network, and the voting data is provided by a plurality of network users.

* * * * *